United States Patent
Clarke et al.

(10) Patent No.: US 6,548,132 B1
(45) Date of Patent: Apr. 15, 2003

(54) PACKAGING BIOLOGICAL MATERIALS

(75) Inventors: Raymond Clarke, Los Altos, CA (US); Donald A. Schultz, San Mateo, CA (US)

(73) Assignee: Landec Corporation, Menlo Park, CA (US)

(*) Notice: Subject to any disclaimer, the term of this patent is extended or adjusted under 35 U.S.C. 154(b) by 0 days.

(21) Appl. No.: 09/121,082

(22) Filed: Jul. 23, 1998

(51) Int. Cl.$^7$ .............................................. B32B 27/00
(52) U.S. Cl. .................... 428/34.7; 428/35.2; 428/35.7; 428/315.9; 428/447; 428/451; 426/118
(58) Field of Search ............................. 428/35.7, 447, 428/448, 451, 521, 523, 34.7, 35.2, 315.9; 426/118, 418, 419

(56) References Cited

U.S. PATENT DOCUMENTS

| | | | |
|---|---|---|---|
| 2,611,709 A | 9/1952 | Plagge ........................... 99/171 |
| 3,102,777 A | 9/1963 | Bedrosian et al. .............. 21/58 |
| 3,423,212 A | 1/1969 | Purcell et al. ................. 99/171 |
| 3,450,542 A | 6/1969 | Badran .......................... 99/154 |
| 3,450,543 A | 6/1969 | Badran et al. ................. 99/171 |
| 3,450,544 A | 6/1969 | Badran et al. ................. 99/171 |
| 3,507,667 A | 4/1970 | Magnen ........................ 99/171 |
| 3,625,876 A | 12/1971 | Fitko ........................... 260/23.7 |
| 3,630,759 A | 12/1971 | Rumberger .................... 99/171 |
| 3,706,410 A | 12/1972 | Baker ........................ 229/16 R |
| 3,795,749 A | 3/1974 | Cummin et al. ............... 426/316 |
| 3,798,333 A | 3/1974 | Cummin et al. ............... 426/106 |
| 3,804,961 A | 4/1974 | Cummin et al. ............... 426/415 |
| 3,844,865 A | 10/1974 | Elton et al. ................... 156/229 |
| 3,903,234 A | 9/1975 | Ikeda et al. ................... 264/210 |
| 3,932,692 A | 1/1976 | Hirata et al. .................. 428/474 |
| 3,975,455 A | 8/1976 | Falender et al. .............. 260/827 |
| 4,055,672 A | 10/1977 | Hirsch et al. ................. 426/127 |
| 4,153,659 A | 5/1979 | Recktenwald et al. ........ 264/83 |
| 4,176,148 A | 11/1979 | Magder et al. ................. 264/41 |
| 4,209,538 A | 6/1980 | Woodruff ...................... 426/314 |
| 4,224,347 A | 9/1980 | Woodruff ...................... 426/106 |
| 4,347,844 A | 9/1982 | Ohki et al. .................... 128/287 |
| 4,350,655 A | 9/1982 | Hoge ........................... 264/145 |
| 4,386,129 A | 5/1983 | Jacoby ......................... 428/215 |
| 4,394,930 A | 7/1983 | Korpman ...................... 220/444 |
| 4,423,080 A | 12/1983 | Bedrosian et al. ............ 426/124 |
| 4,461,420 A | 7/1984 | Horvath ......................... 229/43 |
| 4,472,328 A | 9/1984 | Sugimoto et al. .............. 264/41 |
| 4,485,133 A | 11/1984 | Ohtsuka et al. ................ 428/35 |
| 4,487,791 A | 12/1984 | Komatsu et al. ............... 428/35 |
| 4,513,015 A | 4/1985 | Clough ......................... 426/396 |
| 4,515,266 A | 5/1985 | Myers .......................... 206/205 |
| 4,528,235 A | 7/1985 | Sacks et al. ................... 428/220 |
| 4,698,372 A | 10/1987 | Moss ............................ 521/145 |
| 4,704,238 A | 11/1987 | Okuyama et al. .............. 264/41 |
| 4,705,812 A | 11/1987 | Ito et al. ....................... 521/92 |
| 4,705,813 A | 11/1987 | Ito et al. ....................... 521/92 |
| 4,734,324 A | 3/1988 | Hill ............................. 428/317 |
| 4,769,262 A | 9/1988 | Ferrar et al. ................... 428/35 |
| 4,830,863 A | 5/1989 | Jones ........................... 426/118 |
| 4,833,172 A | 5/1989 | Schwarz et al. ................ 521/62 |
| 4,840,823 A | 6/1989 | Chigami et al. ............. 428/35.5 |
| 4,842,875 A | 6/1989 | Anderson ..................... 426/118 |
| 4,847,145 A | 7/1989 | Matsui ......................... 428/323 |
| 4,861,644 A | 8/1989 | Young et al. .................. 428/195 |
| 4,863,788 A | 9/1989 | Bellairs et al. ................ 428/246 |
| 4,876,146 A | 10/1989 | Isaka et al. .................... 428/347 |
| 4,877,679 A | 10/1989 | Leatherman et al. .......... 428/224 |
| 4,879,078 A | 11/1989 | Antoon, Jr. ..................... 264/41 |
| 4,883,674 A | 11/1989 | Fan ............................. 426/118 |
| 4,892,779 A | 1/1990 | Leatherman et al. .......... 428/220 |
| 4,910,032 A | 3/1990 | Antoon, Jr. ................... 426/118 |
| 4,923,650 A | 5/1990 | Antoon, Jr. et al. ............ 264/41 |
| 4,923,703 A | 5/1990 | Antoon, Jr. ................... 426/118 |
| 4,937,115 A | 6/1990 | Leatherman ................ 428/36.4 |
| 4,939,030 A | 7/1990 | Tsuji et al. .................. 428/315.5 |
| 4,943,440 A | 7/1990 | Armstrong ................... 426/118 |
| 4,956,209 A | 9/1990 | Isaka et al. .................. 428/35.2 |
| 4,960,639 A | 10/1990 | Oda et al. .................... 428/34.5 |
| 5,008,296 A | 4/1991 | Antoon, Jr. et al. ............ 521/91 |
| 5,011,698 A | 4/1991 | Antoon, Jr. et al. .......... 426/395 |
| 5,026,591 A | 6/1991 | Henn et al. ................... 428/198 |
| 5,032,450 A | 7/1991 | Rechlicz et al. ............... 428/196 |

(List continued on next page.)

FOREIGN PATENT DOCUMENTS

| | | |
|---|---|---|
| EP | 0270764 | 6/1988 |
| EP | 0351115 | 3/1989 |
| EP | 0351116 | 3/1989 |
| JP | 61264031 | 11/1986 |
| JP | 62288640 | 12/1987 |
| JP | 6227438 | 2/1994 |
| JP | 6210141 | 8/1994 |
| WO | 9216434 | 3/1991 |
| WO | 9210414 | 6/1992 |
| WO | 9412040 | 6/1994 |
| WO | 9638495 | 5/1996 |

OTHER PUBLICATIONS

P. Veeraju and M. Karel, "Controlling Atmosphere in A Fresh–fruit Package," p. 168–174, 254, Oct. 1966, *Modern Packaging*.

H. Daun & Seymour G. Gilbert, "Film Permeation: The Key to Extending Fresh Produce Shelf Life," p. 50–53, Aug. 1974, *Package Engineering*.

Primary Examiner—Rena L. Dye
(74) *Attorney, Agent, or Firm*—Sheldon & Mak; Jeffrey G. Sheldon (57) ABSTRACT

Novel gas-permeable membranes which are particularly useful in the packaging of fresh cut fruit and vegetables, and other respiring biological materials. The membranes comprise a microporous film or other gas-permeable substrate and, coated on the substrate, a layer of a block copolymer having a heat of fusion of at least 5 J/g and containing polysiloxane polymeric blocks and crystalline polymeric blocks having a melting point of −5 to 40° C.

36 Claims, 1 Drawing Sheet

U.S. PATENT DOCUMENTS

| | | |
|---|---|---|
| 5,035,933 A | 7/1991 | Ilenda et al. ............... 428/36.6 |
| 5,045,331 A | 9/1991 | Antoon, Jr. ................. 426/118 |
| 5,126,197 A | 6/1992 | Schinkel et al. ............ 428/349 |
| 5,153,039 A | 10/1992 | Porter et al. ............. 428/36.92 |
| 5,160,768 A | 11/1992 | Antoon, Jr. ................ 428/35.2 |
| 5,164,258 A | 11/1992 | Shida et al. ............. 428/319.3 |
| 5,196,262 A | 3/1993 | Schwarz et al. ......... 428/315.5 |
| 5,221,571 A | 6/1993 | Cammiss et al. ........... 428/220 |
| 5,254,354 A | 10/1993 | Stewart ...................... 426/106 |
| 5,256,473 A | 10/1993 | Kotani et al. ............... 428/218 |
| 5,271,976 A | 12/1993 | Kondo et al. ............. 428/35.2 |
| 5,275,854 A | 1/1994 | Maier et al. ............... 428/36.5 |
| RE34,537 E | 2/1994 | Deyrup ...................... 428/35.7 |
| RE34,546 E | 2/1994 | Deyrup ....................... 525/674 |
| 5,300,570 A | 4/1994 | Ilenda et al. ................... 525/80 |
| 5,322,726 A | 6/1994 | Dew .......................... 428/216 |
| 5,332,617 A | 7/1994 | Mills et al. .................. 428/215 |
| 5,362,531 A | 11/1994 | Samuel et al. ............. 428/36.6 |
| 5,411,351 A | 5/1995 | Lasch et al. ................... 404/14 |
| 5,523,373 A | 6/1996 | Esselborn et al. ............ 528/26 |
| 5,532,053 A | 7/1996 | Mueller ...................... 428/287 |
| 5,665,822 A | 9/1997 | Bitler et al. .................. 525/92 |
| 5,783,302 A * | 7/1998 | Bitler et al. ................. 426/106 |

* cited by examiner

PACKAGING BIOLOGICAL MATERIALS

FIELD OF THE INVENTION

This invention relates to gas-permeable membranes which are useful in particular for the packaging of biological materials, especially fresh produce.

INTRODUCTION TO THE INVENTION

Fruit and vegetables, and other respiring biological materials, consume oxygen ($O_2$) and produce carbon dioxide ($CO_2$) at rates which depend upon temperature and upon the particular material and the stage of its development. Their storage stability depends on the relative and absolute concentrations of $O_2$ and $CO_2$ in the atmosphere surrounding them, and on temperature. Ideally, a respiring material should be stored in a container having a total permeability to $O_2$ and a total permeability to $CO_2$ which are correlated with (i) the atmosphere outside the package (usually air), (ii) the rates at which the material consumes $O_2$ and produces $CO_2$, and (iii) the temperature, to produce an atmosphere within the container (the "packaging atmosphere") having the desired $O_2$ and $CO_2$ concentrations for preservation of the material. The total permeability to water vapor may also be significant. This is the principle behind the technology of controlled atmosphere packaging (CAP) and modified atmosphere packaging (MAP), as discussed, for example, in U.S. Pat. No. 4,734,324 (Hill), U.S. Pat. No. 4,830,863 (Jones), U.S. Pat. No. 4,842,875 (Anderson), U.S. Pat. No. 4,879,078 (Antoon), U.S. Pat. No. 4,910,032 (Antoon), 4,923,703 (Antoon), U.S. Pat. No. 5,045,331 (Antoon), U.S. Pat. No. 5,160,768 (Antoon) and U.S. Pat. No. 5,254,354 (Stewart), copending, commonly assigned U.S. patent application Ser. No. 08/759,602 filed Dec. 5, 1996 now U.S. Pat. No. 6,376,030, published as International Publication No. WO 96/38495 (Application No. PCT/US96/07939), copending, commonly assigned U.S. patent application Ser. No. 08/926,928, now U.S. Pat. No. 6,013,293 and European Patent Applications Nos. 0,351,115 and 0,351,116 (Courtaulds). The disclosure of each of these documents is incorporated herein by reference.

The $O_2$ transmission rate (referred to herein as OTR) and $CO_2$ transmission rate (referred to herein as COTR), of a body composed of a particular material, are the amounts of $O_2$ and $CO_2$, respectively, which will pass through a defined area of that body under defined conditions. The total permeabilities of a container to $O_2$ and $CO_2$ depend, therefore, upon the areas, OTRs and COTRs of the various parts of the container.

The preferred packaging atmosphere depends on the stored material. For many materials, the preferred concentration of $O_2$ is less than the preferred concentration of $CO_2$. For example, broccoli is generally best stored in an atmosphere containing 1–2% $O_2$ and 5–10% $C_2$; berries are generally best stored in an atmosphere containing 5–10% $O_2$ and 10–20% $CO_2$; and cherries are generally best stored in an atmosphere containing 5–8% $O_2$ and 10–20% $CO_2$. In order to produce a packaging atmosphere having a high ratio of $CO_2$ to $O_2$, the container should have a low ratio of total $CO_2$ permeability to total $O_2$ permeability. The term R ratio is used herein to denote the ratio of COTR to OTR for a particular material or the ratio of total $CO_2$ permeability to total $O_2$ permeability of a container or part of a container.

Respiring biological materials are normally stored at temperatures substantially below normal room temperature, but are often exposed to higher temperatures before being used. At such higher temperatures, the respiration rate increases, and in order to maintain the desired packaging atmosphere, the permeability of the container preferably increases sharply between storage temperatures and room temperature.

Respiring biological materials are generally stored in sealed polymeric containers. Conventional polymeric films, when used on their own, do not provide satisfactory packaging atmospheres because their OTR and COTR values are very low and their R ratios are high. Microporous polymeric films, when used on their own, are also unsatisfactory, but for different reasons; namely because their OTR and COTR values are very high and their R ratios close to 1.0. It has been proposed, therefore, to make use of containers which comprise (i) one or more barrier sections which are relatively large in area and are composed of materials having relatively low OTR and COTR values (e.g. are composed of a conventional polymeric film), and (ii) one or more atmosphere-control members which are relatively small in area and are composed of a microporous film, and which provide at least a large proportion of the desired permeability for the whole container.

However, for containers of conventional size, the preferred total $O_2$ permeability, although larger than can be provided by the barrier sections alone, is still so small that control members made of a microporous film need to be very small in area. Such very small control members are difficult to incorporate into containers, and can easily become blocked in use. In addition, the OTR of microporous films does not change much with temperature.

As described in copending, commonly assigned application Ser. No. 08/759,602 and corresponding International Publication No. WO 96/38495 (referenced above), much improved results can be obtained through the use of atmosphere-control members composed of a membrane prepared by coating a thin layer of a polymer onto a microporous film. The OTR of these membranes is such that the atmosphere-control members are of practical size. Furthermore, through appropriate choice of the coating polymer, in particular the use of a low-melting side chain crystalline (SCC) polymer, the membranes can have OTRs which increase sharply with temperature. However, although the membranes are very satisfactory for many purposes, they often have R ratios which are higher than is optimal when the desired packaging atmosphere contains a relatively large proportion of $CO_2$. As described in copending, commonly assigned application Ser. No. 08/926,928 now U.S. Pat. No. 6,013,293, if a gas-permeable membrane is covered, on the side exposed to the air, by a relatively gas-impermeable cover member having one or more small apertures therein, the R ratio of the combination can be substantially less than the R ratio of the membrane itself.

SUMMARY OF THE INVENTION

In the continuing development of coated membranes of the kind described in the earlier applications, it has been found that their permeabilities are liable to be non-uniform and/or to change during use, particularly when using SCC polymers which give rise to high $P_{10}$ values. This is apparently due to two factors. First, the SCC polymers tend to be somewhat tacky, and, therefore, to be partially removed from the microporous base film during handling. Second, their inherent permeability to gases is such that, in order to produce a coated membrane of desired size and $O_2$ permeability, the coating must be rather thin (e.g. 2–3 microns thick). Such thin coatings are difficult to apply uniformly and are liable to be damaged during use.

This invention provides improved gas-permeable membranes which comprise (a) a gas-permeable substrate, particularly microporous polymeric film, and (b) a polymeric coating on the microporous film, the polymeric coating comprising a block copolymer which has a heat of fusion $\Delta H$ of at least 5 J/g, and which comprises
  (i) polysiloxane polymeric blocks, and
  (ii) crystalline polymeric blocks having a melting point, $T_p$, of –5° to 40° C.

Gas permeable membranes are particularly useful as atmosphere control members in packages for respiring biological materials, and will be chiefly described by reference to such use. It is to be understood, however, that the invention includes gas-permeable membranes which are useful for other purposes.

Even a small proportion of polysiloxane blocks reduces the tack of the polymer coating; and as the proportion of polysiloxane blocks increases, the inherent permeability of the copolymer increases, making it possible to increase the thickness of the coating so that the coating is durable and easy to apply, without an increase in the size of the atmosphere control members. For example, this invention makes it possible to prepare gas-permeable membranes which are resistant to damage through abrasion, have uniform properties, and which combine (a) a $P_{10}$ ratio over at least 10° C. range between –5 and 15° C. of at least 1.8, e.g. 2.0 to 2.8, particularly a $P_{10}$ ratio between 0 and 10° C. of at least 2.0, and (b) an OTR at all temperatures between 20 and 25° C. of at least 2,325,000 ml/m²·atm·24 hrs (150,000 cc/100 inch²·atm·24 hrs), e.g. 2,480,000 to 3,410,000 ml/m²·atm·24 hrs (160,000 to 220,000 cc/inch²·atm·24 hrs).

BRIEF DESCRIPTION OF THE DRAWING

The invention is illustrated in the accompanying drawings, in which.

DETAILED DESCRIPTION OF THE INVENTION

In describing the invention, the following abbreviations, definitions, and methods of measurement are used. OTR is $O_2$ permeability. COTR is $CO_2$ permeability. OTR and COTR values are measured at about 22° C. unless otherwise noted, and given in ml/m²·atm·24 hr, with the equivalent in cc/100 inch²·atm·24 hr. in parentheses. OTR and COTR values were measured using a permeability cell (supplied by Millipore) in which a mixture of $O_2$, $CO_2$ and helium is applied to the sample, using a pressure of 0.035 kg/cm² (0.5 psi), and the gases passing through the sample were analyzed for $O_2$ and $CO_2$ by a gas chromatograph. The cell could be placed in a water bath to control the temperature. The abbreviation $P_{10}$ is used to denote the ratio of OTR at a first temperature $T_1$° C. ($OTR_1$) to OTR at a second temperature $T_2$° C. ($OTR_2$), where $T_2$ is $(T_1-10)$° C., $T_1$ being a temperature in the range 10–25° C.; or, when $T_2$ is a temperature which is not $(T_1-10)$° C., but is a temperature lower than $T_1$, to denote the ratio $$P_{10} = \exp\left[\frac{10}{T_1 - T_2} \cdot \ln\left(\frac{OTR_1}{OTR_2}\right)\right]$$

The abbreviation R is used to denote the ratio of COTR to OTR. Pore sizes are measured by mercury porosimetry or an equivalent procedure. $T_O$ denotes the onset of melting, $T_p$ denotes the crystalline melting point, and $\Delta H$ denotes the heat of fusion. $T_O$, $T_p$ and $\Delta H$ are measured by means of a differential scanning calorimeter (DSC) at a rate of 10° C./minute and on the second heating cycle.

Microporous Base Films

The microporous base film preferably used as the porous substrate in this invention comprises a polymeric matrix which provides a network of interconnected pores such that gases can pass through the film. The average pore size of the base film can be 0.02 to 5 micron, but is preferably greater than 0.05 micron and less than 0.24, particularly less than 0.20, especially less than 0.15, micron. Preferably at least 70%, particularly at least 90%, of the pores have a pore size of less than 0.24 micron. Preferably at least 60%, particularly at least 80%, of the pores have a pore size of less than about 0.15 micron. Particularly at least 60%, especially at least 70%, of the pores have a pore size of less than about 0.11 micron. The pores preferably constitute 35 to 80%, particularly 60 to 75%, by volume of the film. A narrow range of pore sizes is preferred. For example, it is preferred that less than 20% of the pores have a size less than 0.014 micron, and that less than 20% of the pores have a pore size greater than 0.13 micron.

It is highly desirable that the base film should have sufficient strength (and other physical properties) to ensure that it is not damaged in processing or in use as part of a container. Accordingly, the base film preferably has a tear strength of at least 30 g, particularly at least 70 g, when measured by the following test. A sample of the film, 10 by 1.27 cm, is used. A slit 5 mm long is made in one of the short sides. The two flaps on either side of the slit are placed in opposing jaws of an Instron tensile tester, and the tear strength measured at a jaw separation rate of 12.7 cm (5 inch)/minute. If the base film has too low a tear strength, it is possible to prepare a satisfactory membrane by laminating the base film, before or after it has been coated, to a support film which has a satisfactory tear strength and sufficient porosity that its presence does not adversely affect the permeability of the coated membrane. However, the added cost of this expedient is highly undesirable.

It is also preferred that the microporous base film should have a Sheffield smoothness of at least 30. It is also preferred that the base film is composed of a material that can be heat-sealed.

Preferred polymers for polymeric matrix of the base film are (1) essentially linear ultrahigh molecular weight polyethylene having an intrinsic viscosity of at least 18, preferably 18 to 39, deciliters/gram, (2) essentially linear ultrahigh molecular weight polypropylene having an intrinsic viscosity of at least 6 deciliters/gram, and (3) mixtures of (1) and (2).

The preferred base film includes a finely divided, particulate, substantially water-insoluble, inorganic filler, for example a siliceous filler, which is distributed throughout the matrix and which is present in amount 50 to 90%, particularly 50 to 85%, by weight of the base film. The filler is preferably silica, particularly precipitated silica, especially silica having an average ultimate particle size of less than 0.1 micrometer. Preferably the filler occupies 35 to 80% of the total volume of microporous film. Particularly preferred, because they have a relatively narrow range of pore sizes, are films made by extruding a polymeric composition which contains an inorganic filler and a processing oil, e.g. a parafinic oil, naphthenic oil or aromatic oil, uniformly distributed therein; followed by extraction of the processing oil, e.g. with trichloroethylene. Suitable films are disclosed, for example, in U.S. Pat. Nos. 4,937,115 and 3,351,495, the disclosures of which are incorporated herein by reference. Such films are sold by PPG Industries under the tradename "Teslin".

The thickness of the base film is preferably 0.03 to 0.65 mm.

The microporous base film can be modified by calendering at a nip pressure of 17.8 to 266.6 kg per linear cm (100 to 1500 pli). Calendering the base film often results in coated films which have reduced OTR values and increased R values. The base film can be uniaxially or biaxially calendered. The base film can also be stretched, uniaxially or biaxially.

The Block Copolymer

The term block copolymer is used in this specification in a broad sense to include random block copolymers, ordered block copolymers (including thermoplastic elastomers, and graft block copolymers in which one of the blocks is the polymer backbone and the other blocks are pendant from the backbone).

The block copolymer used as a coating polymer in this invention comprises, and may consist essentially of, (i) polysiloxane polymeric blocks, and
(ii) crystalline polymeric blocks having a melting point $T_p$ of $-5°$ C. to $40°$ C.

The crystalline polymeric blocks must have sufficient crystallinity, and be present in a large enough proportion, that the block copolymer has a heat of fusion $\Delta H$ of at least 5 J/g, preferably at least 10 J/g, with higher values resulting in higher $P_{10}$ values. The polysiloxane polymeric block must be present in amount sufficient to reduce the tackiness of the crystalline polymer to a level such that the layer of coating polymer is not easily damaged during routine handling. A small proportion, e.g. 5 to 15% by weight of the block copolymer, can be effective for this purpose. However, it is usually preferred that the copolymer should contain the polysiloxane blocks in amount such that the oxygen permeability of the copolymer is substantially greater than the oxygen permeability of the crystalline polymer alone, for example at least 1.2 times, preferably at least 1.5 times, the oxygen permeability of the crystalline polymer alone. For this purpose, the copolymer may contain, for example, up to 80% of the polysiloxane blocks, and preferably contains 15 to 60%, particularly 20 to 40% of polysiloxane blocks. It is preferred that the oxygen permeability of the block copolymer is such that the coating weights at which it can be conveniently and consistently applied result in a coated membrane having the desired OTR.

The crystalline polymeric blocks have a melting point $T_p$ of $-5°$ to $40°$ C., with $T_p$ being selected with a view to the temperature range over which an increase in OTR is desired. Generally $T_p$ is from $-5°$ to $15°$ C. The crystalline polymeric blocks can all be of the same kind, or there can be two or more different kinds of crystalline polymer block. Suitable polymers from which the crystalline polymeric blocks can be derived include the polymers described in U.S. Pat. No. 5,254,354, the disclosure of which is incorporated herein by reference. Particularly preferred are side chain crystalline (SCC) polymers. SCC polymers can be prepared for example by copolymerizing (i) at least one n-alkyl or fluoroalkyl acrylate or methacrylate in which the alkyl group contains at least 12 carbon atoms, preferably one or more of docosanyl, octadecyl, hexadecyl, tetradecyl, and dodecyl acrylates, and (ii) one or more comonomers selected from acrylic acid, methacrylic acid, esters of acrylic or methacrylic acid in which the esterifying group contains less than 10 carbon atoms, e.g. hydroxyethyl butyl, hexyl, cyclohexyl, or 2-ethyl hexyl, and highly polar monomers such as polyethylene glycol acrylate or methacrylate. These SCC polymers generally have a high R ratio, e.g. greater than 5, except for those polymers which contain substantial amounts of fluoroalkyl and/or cycloalkyl groups.

Particularly preferred SCC polymers for this invention are those prepared by copolymerizing (i) at least one n-alkyl acrylate or methacrylate in which the n-alkyl group contains at least 12 carbon atoms and (ii) one or more comonomers selected from acrylic acid, methacrylic acid, and esters of acrylic or methacrylic acid in which the esterifying group contains less than 10 carbon atoms.

The polysiloxane blocks in the block copolymer can be derived from conventional polysiloxanes, e.g. polyalkyl siloxanes, for example polydimethylsiloxanes and polymethyl n-alkyl siloxanes wherein the n-alkyl group contains at least dodecyl, tetradecyl or hexadecyl group or other group which confers crystalline character on the polysiloxane. The polysiloxane blocks can all be of the same kind or there can be two or more different kinds of polysiloxane block.

The block copolymers can be prepared using conventional synthetic techniques. One method of making the block copolymer comprises copolymerizing a mixture of reactants which comprises (i) one or more monomers which will react to form a crystalline polymer, e.g. monomers which comprise at least one n-alkyl acrylate or methacrylate in which the n-alkyl group contains at least 12 carbon atoms, and
(ii) a polysiloxane having a copolymerizable group, e.g. a methacryloxypropyl group, at one end of the polymer chain.

The block copolymers prepared by this method have a backbone which provides the crystalline block, and polysiloxane blocks which are pendant from that backbone. These copolymers are believed to be novel, and as such form part of the present invention.

Another method comprises reacting (i) a crystalline polymer having a melting point of $-5$ to $40°$ C. and containing at least one reactive group, and
(ii) a polysiloxane containing at least one group which will react with said reactive group on the crystalline polymer.

Suitable reactive groups in the polysiloxane include amino groups. Suitable reactive groups in the crystalline polymer include carboxylic acid groups which will react with amino groups on a polysiloxane. For further details of suitable synthetic methods, reference may be made to U.S. Pat. No. 5,665,822, the disclosure of which is incorporated herein by reference.

The block copolymer can contain other blocks which are not polysiloxane blocks or crystalline blocks as defined above. Two or more block copolymers as defined above can be blended together, or the block copolymer(s) as defined above can be blended with another polymer.

Coating Compositions

The coating polymer is preferably applied to the porous substrate as a coating composition which comprises the coating polymer dissolved in a suitable solvent, e.g. toluene, tetrahydrofuran, heptane or methyl ethyl ketone. After the composition has been applied, the solvent is removed by heating, leaving the polymer adherent to the substrate. The concentration of the coating polymer in the coating composition is preferably 2 to 12%, e.g. 5 to 10%, based on the weight of the composition. The coating composition can contain other ingredients in addition to the polymer and the solvent.

Application of the Coating Compositions

The coating can be carried out in any convenient way, for example by hand using a Meyer rod, or using commercially available coating equipment, e.g. gravure-coating equipment, which is preferred, or knife-over-roll equipment. A single coating is normally adequate, but a second coating of the same or a different coating composition can be applied after drying the first. Preferably the coating is carried out using a gravure coating roll having a theoretical cell volume of $31 \times 10^6$ to $232.5 \times 10^6$ cubic microns per $mm^2$ ($20 \times 10^9$ to $150 \times 10^9$ cubic microns per $inch^2$), preferably $62 \times 10^6$ to $124 \times 10^6$ cubit microns per $mm^2$ ($40 \times 10^9$ to $80 \times 10^9$ cubic microns per $inch^2$), or using equipment which provides a similar coating weight. The coating weight can vary widely, for example from 0.5 to 30 $g/m^2$, and is preferably 1.5 or 5, e.g. 2.9 to 3.6 $g/m^2$.

Properties of the Membranes

As discussed above, the properties of the membranes of the invention depend upon a number of factors, including the base film, the coating polymer, the coating composition, and the amount of coating composition applied to the base film. The membrane preferably has a $P_{10}$ ratio, over at least one 10° C. range between −5 and 15° C., preferably over at least one 10° C. range between 0° C. and 15° C., of at least 1.3, preferably at least 2, particularly at least 2.5, especially at least 2.6. The membrane preferably has an OTR of 775,000 to 7,750,000 (50,000 to 500,000), preferably 1,550,000 to 3,875,000 (100,000 to 250,000), particularly at least 2,325,000 (150,000). When the OTR is 775,000 to 3,100,000 (50,000 to 200,000), the R ratio of the membrane is preferably at least 2, particularly at least 2.5, especially at least 3; and when the OTR is 775,000 to 3,100,000 (50,000 to 200,000), the R ratio is preferably more than 3.8−0.00000045 P' (3.8−0.000007P), particularly up to 7.4−0.00000116 P' (7.4−0.000018P), especially up to 5.6−0.0000084 P' (5.6−0.000013P), where P' is the OTR in $ml/m^2 \cdot atm \cdot 24$ hrs, and P is the OTR in $cc/100\ inch^2 \cdot atm\ 24$ hrs. The membrane preferably also has these values for OTR and R when the OTR and COTR are measured at any temperature between 20° C. and 25° C. The membrane preferably has these values for OTR, $P_{10}$ and R both when the $O_2$ and $CO_2$ permeabilities are measured at 0.7 $kg/cm^2$ (10 psi) and when they are measured at 0.035 $kg/cm^2$ (0.5 psi).

The membrane can be covered by a covering layer, so that the polymeric coating is sandwiched between the microporous film and the covering layer, providing that the covering layer is sufficiently porous not to have an adverse effect on permeability. The covering layer is generally different from, but can be the same as, the base film. The cover layer can be melt-bonded to the coated film. However, the use of a covering layer adds to the cost of the product.

The properties of the membrane can be modified by calendering, uniaxially or biaxially, preferably at a nip pressure of 17.8 to 266.6 kg per linear cm (100 to 1500 pli). Calendering generally reduces the OTR and increases the R ratio of the membrane.

Containers

In use, the novel gas-permeable membrane of this invention provides at least part of an atmosphere-control member in a container which is sealed (or is ready to be sealed) around a respiring biological material. The control member can include a cover member as described in U.S. application Ser. No. 08/926,928, now U.S. Pat. No. 6,013,293. The container can contain a single novel control member, or two or more novel control members (which will usually be the same, but can be different). In some cases, in order to ensure that the internal pressure within the container can equilibrate with ambient pressure, the container can contain a pinhole. The invention includes the possibility that the container also contains one or more atmosphere-control members which are not in accordance with the present invention.

The remainder of the container; i.e. the barrier section or sections, which is of much larger area than the control member(s), is composed of one or more materials which are relatively impermeable to $O_2$ and $CO_2$; e.g. a suitable polymeric film or other shaped article. In some cases, the barrier sections are composed of a material whose OTR and COTR are so low that the packaging atmosphere is substantially determined only by the control member(s). In other cases, the barrier sections have OTR and COTR values which (although low) are high enough that, having regard to the relative large area of the barrier section(s), a substantial proportion of the $O_2$ entering the packaging atmosphere passes through the barrier sections. At 22° C., this proportion can be, for example, as high as 50%, but is generally less than 25%. Typically, the barrier section is provided by a bag of flexible polymeric film or by two preformed, relatively rigid, polymeric members which have been heat-sealed to each other, and the atmosphere-control member covers an aperture cut into the bag or one of the preformed members. The control member(s) can be secured to the barrier section (s) in any way, for example through heat sealing or with an adhesive.

The size of the containers can vary considerably. In one category, the container contains up to 2.26 kg (5 lb) of produce. In another category, the containers are much larger, e.g. containing up to 1500 lb. (680 kg) of produce.

A wide range of respiring biological materials can be packaged in containers of the invention, including cherries, broccoli, cut lettuce, cauliflower, mushrooms, asparagus, and strawberries.

The size and nature of atmosphere-control members control the absolute and relative amounts of $O_2$ and $CO_2$ which can enter and leave the container, and, therefore, the packaging atmosphere within the container. The desired packaging atmosphere will depend upon the biological material within the container, and the temperature, and the atmosphere-control member(s) should be selected accordingly. Those skilled in the art of packaging biological materials will have no difficulty, having regard to the disclosure in this specification and their own knowledge, in designing containers which will give substantially improved results under practical conditions of use and which can be economically manufactured.

The invention is illustrated in the following Examples, which are summarized in Tables 1, 2 and 3 below, and some of which are comparative examples, as indicated by an asterisk (*) by the Example number. In the Examples, the following additional abbreviations are used.

ADMS is a polydimethyl siloxane terminated at each end by an amino group and having an $M_w$ of about 27,000, which is available from Gelest, Tulleytown, Pa., under the tradename DMSA-32.

VDMS is a polydimethyl siloxane terminated at each end by a vinyl group and having an $M_w$ of about 28,000, which is available from Gelest under the tradename DMSV-31.

MACDMS is a polydimethylsiloxane terminated at one end only by a methacryloxypropyl group, which is available from Gelest under the trade name MCR M-17.

DMS is a room temperature vulcanizable (RTV) polydimethyl siloxane available from General Electric under the tradename Sylgard 184.

AIBN is 2,2'-azobis (2-methylpropionitrile).

Esperox is t-amylperoxy-2-ethylhexanoate, which is available from Witco Corp. under the tradename Esperox 570.

V501 is 4,4-azobis (4-cyanopentanoic acid).

TMI is dimethyl meta-isopropenyl benzyl isocyanate, which is available from American Cyanamid under the tradename TMI.

Teslin SP7 is a microporous polyethylene film containing about 50% silica, which is available from PPG Industries under the tradename Teslin SP7. It has a thickness of about 0.18 mm (0.007 inch), a tear strength of about 90 g, a porosity of about 65%, an average pore size of about 0.1 micron and a largest pore size of 4–10 microns.

BuAc is butyl acetate.

MEK is methyl ethyl ketone.

EXAMPLE A1–A7

Examples A1–A7 show the preparation of SCC polymers. Examples A1–A5 show the preparation of SCC polymers which are subsequently reacted with a polysiloxane to form a block copolymer. Examples A6 and A7 show the direct preparation of SCC/siloxane block copolymers through the use of a polysiloxane which is terminated at one end with an unsaturated group which will copolymerize with the acrylate monomers. SCC polymers having the $M_w$, $M_n$, $T_p$ and $\Delta H$ values shown in Table 1 were prepared using the monomers, solvents and initiators, and amounts thereof (in parts by weight) shown in Table 1. In a first phase, the monomers, and the solvents and initiators shown for the first phase, were maintained at the temperature and for the time shown in Table 1 for the first phase. In Examples 2 and 4, the heptane was added 2 hours after the heating of the first phase had commenced. In a second phase, polymerization was completed by adding the initiators shown in Table 1 for the second phase and maintaining the reaction mixture at the temperature and for the time shown in Table 1 for the second phase.

EXAMPLE B1–B6

In Examples B1, B2, B4, B5 and B6, SCC/siloxane block copolymers were prepared using one of the SCC polymers prepared in Examples A2 to A5 and a polysiloxane, in the amounts (in parts by weight) shown in Table 2. In Example B1, the reaction was carried out in butyl acetate (260 parts by weight), and the reaction mixture was heated under reflux at 110° C. for 6 hours. Similar reaction conditions were employed in Examples B2–B5. In Example B6, the SCC polymer (A5) was diluted to 4% solids, and the polysiloxane (ADMS) was then added). The resulting mixture was immediately applied to the substrate using a gravure coating cylinder as described below, and reaction between the SCC and siloxane polymers took place on the substrate. In Example B3, the SCC polymer and the polysiloxane were merely blended together, and no reaction took place between them.

TESTING

The SCC polymers prepared in Examples A1 and A3, the SCC/siloxane block copolymers prepared in Examples A6, A7, B1, B2, B4, B5 and B6, the SCC polymer/polysiloxane blend prepared in Example B3, and DMS were tested as set out below, and the results are shown in Table 3 below.

The DMS was diluted to 90% solids with toluene and hand-coated onto Teslin SP7 using a #30 Meyer rod. The other polymers were diluted in a suitable solvent (usually heptane) to a desired concentration, as shown in Table 3. The diluted solution was coated onto a Teslin SP7 substrate using a gravure coating cylinder having a theoretical cell volume of $59 \times 10^9$ cubic microns per $inch^2$, and then allowed to dry. The coating weight of the dry polymer varies, for example, with the molecular weight of the polymer; when the concentration of the polymer is 5–8%, the use of this gravure coating cylinder results in a dry coating weight of about 1.5–4 $g/m^2$. After a period of days, as set out in Table 3, the OTR and COTR of the coated substrate were measured and the value of R was calculated. The values obtained changed somewhat during the first four days after coating, but did not change substantially thereafter. The OTR and COTR of a number of different samples were measured, and Table 3 reports the average of four samples, and, in the column headed OTR RSD %, the standard deviation of the measured samples, expressed as a percentage.

For some samples, the OTR was measured at 0° C. and 10° C., or at 7° and 22° C., and the $P_{10}$ value was calculated, and is reported in Table 3. The $P_{10}$ value of the 5% B4 sample between 5° and 15° C. was also measured and found to be 3.4.

Some samples were subjected to an abrasion test. In the abrasion test, a 1.82 kg (4 lb.) roller covered with a film of polyethylene terephthalate 0.05 mm (0.002 inch) thick was rolled 50 times over the sample (25 times back and forth) while the sample was at about 22° C. After the abrasion test, the OTR of the sample was measured; and the % increase in OTR was calculated and is reported in Table 3 in the column headed "25-cycle OTR increase %".

Some samples were tested by applying the sample to a latex rubber substrate, using an Instrumentors Inc. 4 lb. PR 1000 Power Roll at 22° C., and, after 20 minutes determining the peel strength of the resulting laminate, using an Instrumentors Inc. peel tester at 254 mm (10 inches) per minute. The peel test was carried out on a number of different samples, and Table 3 reports, in the column headed "Peel RSD %" the standard deviation of the measured samples, expressed as a percentage.

Figure 1:
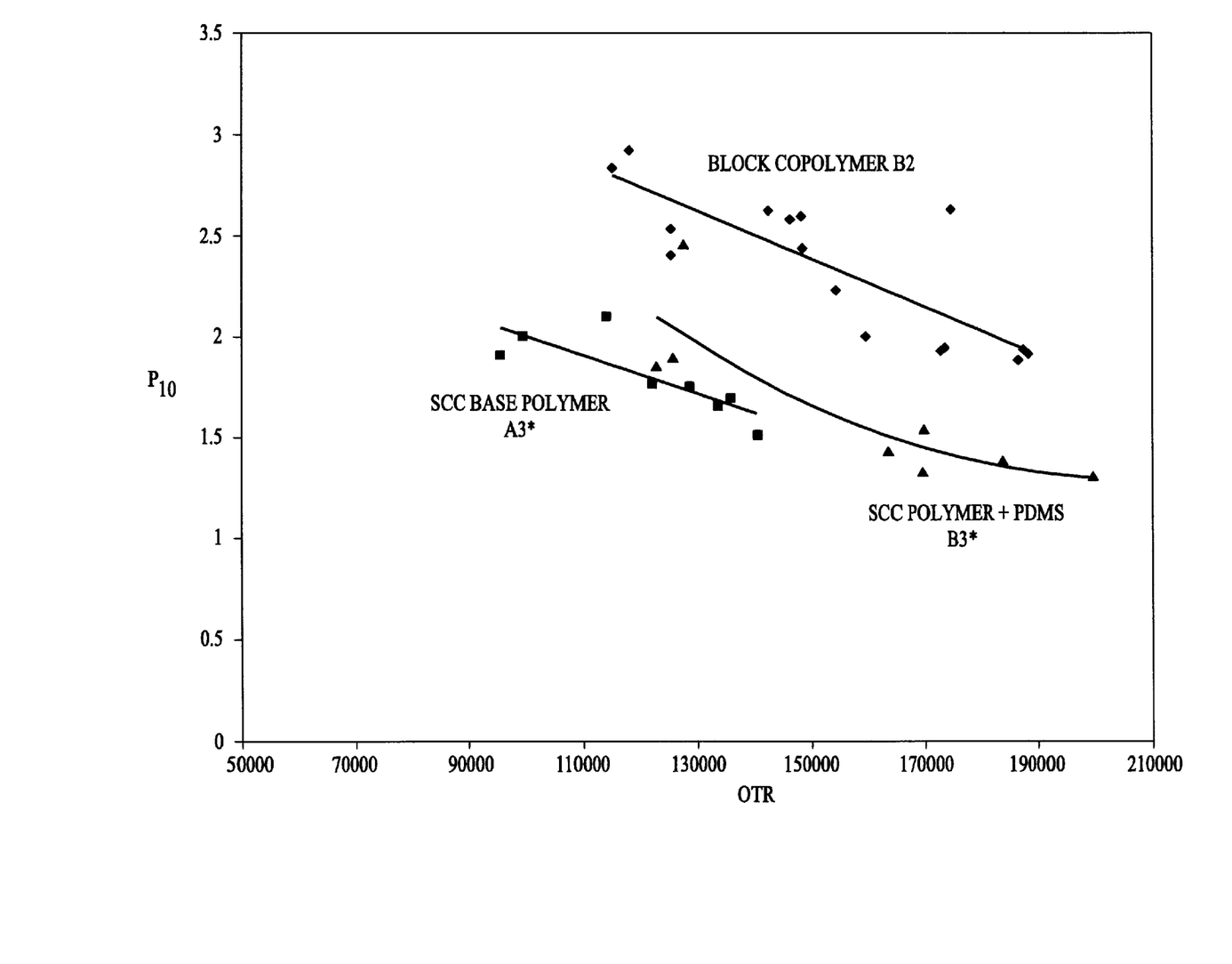
FIG. 1 shows the OTRs and $P_{10}$ values of coated membranes prepared in the Examples.

The individual $P_{10}$ and OTR values (i.e. not the averages reported in Table 3) measured in Examples A3*, B2* and B3 are shown graphically in FIG. 1.

In Table 3 and FIG. 1, the OTR values are expressed in cc/100 $in^2$.atm.24 hr.

TABLE 1

|  | A1 | A2 | A3 | A4 | A5 | A6 | A7 |
|---|---|---|---|---|---|---|---|
| Monomers | | | | | | | |
| C14A | 55 | 56.5 | 85 | 60 | 85 | 43.2 | 33.2 |
| C12A | — | — | — | 39.9 | — | 36.8 | 26.8 |
| C6A | 42 | 43.5 | 15 | — | 15 | — | — |
| AA | 3 | — | — | 0.1 | — | — | — |
| TMI | — | — | — | — | 0.4 | — | — |
| MACDMS | — | — | — | — | — | 20 | 40 |
| PHASE 1 | | | | | | | |
| Solvents | | | | | | | |
| BuAc | 95 | — | — | 30 | 100 | 200 | 200 |
| Heptane | 45 | 150 | 150 | 70 | — | — | — |
| MEK | — | 50 | 50 | — | — | — | — |
| Initiator | | | | | | | |
| AIBN | 0.25 | — | — | 0.35 | 0.3 | 0.1 | 0.1 |
| V501 | — | 0.425 | 0.3 | — | — | — | — |
| Temp (° C.) | 54 | 54 | 54 | 54 | 54 | 75 | 75 |
| Time (Hr.) | 12 | 16 | 16 | 12 | 12 | 12 | — |
| PHASE 2 | | | | | | | |
| Initiator | | | | | | | |
| Esperox | 0.5 | — | — | 0.5 | 0.67 | — | — |
| AIBN | — | 0.0875 | 0.0875 | — | — | 0.05 | 0.05 |
| Temp (° C.) | 100 | 70 | 70 | 100 | 100 | 85 | 85 |
| Time (Hr.) | 4 | 4 | 4 | 4 | 4 | 4 | 4 |
| Product | | | | | | | |
| $M_w$ | 838 k | 645 k | 626 k | 737 k | 1042 k | 335 k | 421 k |
| $M_n$ | 210 k | 70 k | 75 k | 96 k | 331 k | 105 k | 148 k |
| $T_p$ | −3.6 | −6.6 | 13.0 | 12.6 | — | 8.8 | 9.1 |
| ΔH | 12 | 32.9 | 47.4 | 58.6 | — | 44.4 | 25.1 |

TABLE 2

|  | B1 | B2 | B3* | B4 | B5 | B6 |
|---|---|---|---|---|---|---|
| A2 | 180 | — | — | — | — | — |
| A3 | — | 40 | 85 | — | — | — |
| A4 | — | — | — | 100 | 100 | — |
| A5 | — | — | — | — | — | 100 |
| ADMS | 32 | 10 | — | 18.75 | 33 | 25 |
| VDMS | — | — | 15 | — | — | — |

TABLE 3

| Polymer | Wt. % | OTR | OTR RSD % | R | Peel | Peel RSD % | 25-cycle increase % | $P_{10}$ | Day |
|---|---|---|---|---|---|---|---|---|---|
| *A1 | 6 | 107 k | 1.0 | 6.21 | 271 | — | 580 | 1.23≅ | 8 |
|  | 7 | 90 k | 3.3 | 6.26 | 259 | — | 1240 | 1.22≅ | 8 |
|  | 8 | 81 k | — | 5.7 | 262 | — | 1970 | 1.24≅ | 8 |
|  | 9 | 67 k | 2.3 | 6.53 | 267 | — | 4570 | 1.24≅ | 8 |
| B1 | 5 | 320 k | 4.5 | 4.25 | 5.1 | — | — | — | 2 |
|  | 6 | 278 k | 1.0 | 4.29 | 5.4 | 18.2 | — | — | 2 |
|  | 7 | 167 k | 6.6 | 5.72 | 6.0 | 19.9 | — | — | 2 |
|  | 8 | 140 k | 10.1 | 5.98 | 4.8 | 29.3 | — | — | 2 |
|  | 10 | 128 k | 8.4 | 6.03 | 5.6 | 32.1 | 8.3 | 1.36 | 2 |
| *A3 | 6 | 182 k | 9.5 | 3.57 | 20.6 | 32.3 | 0 | 1.61 | 10 |
|  | 8 | 104 k | 0.9 | 4.15 | 30.3 | 14.1 | — | — | 10 |
|  | 10 | 98 k | 0.4 | 5.04 | 68.5 | 17.5 | — | 2.0 | 10 |
|  | 8 | 126 k | 8.0 | 4.68 | — | — | −5.7 | 1.76 | 25 |
| B2 | 5 | 281 k | 32.3 | 3.3 | 4.9 | 4.6 | — | 1.2 | 11 |
|  | 8 | 143 k | 13.5 | 5.3 | 6.6 | 38.6 | — | — | 2 |
|  | 8 | 184 k | 3.5 | 4.0 | — | — | — | 2.0 | 71 |

TABLE 3-continued

| Polymer | Wt. % | OTR | OTR RSD % | R | Peel | Peel RSD % | 25-cycle increase % | $P_{10}$ | Day |
|---|---|---|---|---|---|---|---|---|---|
| | 11.5 | 121 k | 4.3 | 5.1 | 12.9 | 35.5 | −6.7 | 2.6 | 1 |
| | 11.5 | 150 k | 0.7 | 5.3 | — | — | — | 2.5 | 15 |
| | 11.5 | 146 k | 1.9 | 5.4 | — | — | — | 2.6 | 68 |
| *B3 | 5 | 542 k | 7.4 | 1.6 | 5.8 | 23.7 | — | — | 7 |
| | 8 | 155 k | 6.7 | 3.6 | 11.7 | 17.9 | — | — | 7 |
| | 8 | 170 k | 18.1 | 3.4 | — | — | — | 1.49 | 16 |
| | 11.5 | 120 k | 13.0 | 4.0 | 36.3 | 3.9 | 7.1 | — | 7 |
| | 11.5 | 145 k | 16.8 | 3.5 | — | — | — | 1.5 | 19 |
| B4 | 5 | 147 k | 4.1 | 6.1 | — | — | — | 3.2 | 7 |
| | 8 | 125 k | 7.3 | 5.3 | — | — | — | — | 7 |
| | 8 | 169 k | 3.8 | 4.1 | — | — | — | 2.3 | 64 |
| | 11.5 | 98 k | 28.9 | 5.0 | — | — | — | — | 7 |
| B5 | 5 | 225 k | 13.4 | 3.9 | — | — | — | — | 18 |
| | 8 | 162 k | 0.7 | 6.6 | — | — | — | — | 10 |
| | 8 | 180 k | 12.8 | 4.1 | — | — | — | — | 18 |
| | 8 | 176 k | 5.1 | 4.1 | — | — | — | 2.0 | 54 |
| | 11.5 | 144 k | 2.2 | 5.7 | — | — | — | — | 10 |
| B6 | 5 | 175 k | 4.2 | 6.4 | — | — | — | 3.4 | 5 |
| A6 | 5 | 381 k | 16.6 | 3.1 | — | — | — | 1.6 | 5 |
| | 11.5 | 179 k | 22.9 | 4.2 | — | — | — | 2.8 | 4 |
| A7 | 5 | 629 k | 7.6 | 3.3 | — | — | — | — | 1 |
| | 8 | 481 k | 8.4 | 3.5 | 13.3 | 23.4 | — | — | 1 |
| | 11 | 420 k | 4.1 | 3.8 | 21.8 | 15.2 | — | 2.0 | 7 |
| *DMS | 90 | 73 k | 2.1 | 4.8 | — | — | — | ≅1.2 | 11 |

Note to Table 3:
≅ means that the $P_{10}$ value given is the $P_{10}$ value between 7° and 22° C.

What is claimed is:
1. A gas-permeable membrane which comprises
(a) a microporous film which comprises a polymeric matrix which provides a network of interconnected pores such that gases can pass through the film, and
(b) a polymeric coating on the microporous film, the polymeric coating comprising a block copolymer which has a heat of fusion ΔH of at least 5 J/g, and which comprises
(i) polysiloxane polymeric blocks, and
(ii) crystalline polymeric blocks having a melting point, $T_p$, of −5 to 40° C.
2. A membrane according to claim 1 which
(i) has a $P_{10}$ ratio, over at least one 10° C. range between −5° and 15° C., of at least 1.8; and
(ii) has an oxygen permeability (OTR) at all temperatures between 20 and 25° C., of at least 2,325,000 ml/m²·atm·24 hrs (150,000 cc/100 inch²·atm·24 hrs); the $P_{10}$ and OTR values being measured at a pressure of 0.035 kg/cm² (0.5 psi).
3. A membrane according to claim 1 which
(i) has a $P_{10}$ ratio, over at least one 10° C. range between −5° and 15° C. of 2.0 to 2.8; and
(ii) has an oxygen permeability at all temperatures between 20° and 25° C. of 2,480,000 to 3,410,000 ml/m²·atm·24 hrs. (160,000 to 220,000 cc/inch²·atm·24 hrs).
4. A membrane according to claim 1 wherein the microporous film
(1) has an average pore size greater than 0.05 micron and less than 0.24 micron;
(2) comprises a polymeric matrix selected from the group consisting of (a) essentially linear ultrahigh molecular weight polyethylene having an intrinsic viscosity of at least 18 deciliters/g and (b) essentially linear ultrahigh molecular weight polypropylene having an intrinsic viscosity of at least 6 deciliters/g; and
(3) comprises a finely divided, particulate, substantially insoluble filler which is distributed throughout the film.
5. A membrane according to claim 1 wherein the coating weight of the block polymer is 0.5 to 30 g/M².
6. A membrane according to claim 1 wherein the coating weight of the block copolymer is 0.5 to 5 g/m².
7. A membrane according to claim 1 wherein $T_p$ is −5 to 15° C.
8. A membrane according to claim 1 which has a $P_{10}$ ratio between 0 and 10° C. of at least 2.0, the $P_{10}$ being measured at a pressure of 0.035 kg/cm² (0.5 psi).
9. A membrane according to claim 1 which
(1) has an OTR of 775,000 to 3,875,000 ml/m²·atm·24 hrs (50,000 to 250,000 cc/100 inch²·atm·24 hrs); and
(2) has an R ratio of at least 2.5;
the OTR and R values being measured at a pressure of 0.035 kg/cm² (0.5 psi).
10. A membrane according to claim 1 wherein the block copolymer has at least one of the following characteristics:
(1) it has a $T_p$ of 0 to 15° C. and a ΔH of at least 10 J/g;
(2) the crystalline polymeric blocks are side chain crystalline polymeric blocks; and
(3) $T_p$−$T_o$ is less than 10° C., where $T_o$ is the onset of melting temperature.
11. A membrane according to claim 1 wherein the crystalline polymeric blocks in the block copolymer were prepared by copolymerizing (i) at least one n-alkyl acrylate or methacrylate in which the n-alkyl group contains at least 12 carbon atoms and (ii) one or more comonomers selected from acrylic acid, methacrylic acid, and esters of acrylic or methacrylic acid in which the esterifying group contains less than 10 carbon atoms.
12. A membrane according to claim 1 wherein the block copolymer was prepared by copolymerizing a mixture of reactants which comprises (i) at least one n-alkyl acrylate or methacrylate in which the n-alkyl group contains at least 12 carbon atoms and (ii) a polysiloxane having a copolymerizable group at one end thereof.

13. A membrane according to claim 1 wherein the block copolymer was prepared by reacting
   (i) a crystalline polymer having a melting point of −5 to 40° C. and containing at least one reactive group, and
   (ii) a polysiloxane containing at least one reactive group which will react with said reactive group on the crystalline polymer.

14. A membrane according to claim 1 wherein the block copolymer is a random block copolymer or a graph block copolymer in which one of the blocks is the polymer backbone and the other blocks are pendant from the backbone.

15. A package which is stored in air and which comprises
   (a) a sealed container, and
   (b) within the sealed container, a respiring biological material and a packaging atmosphere around the biological material;
the sealed container comprising
   (i) one or more barrier sections, and
   (i) one or more atmosphere-control members;
   the one or more barrier sections, by comparison with the one or more atmosphere-control members, being relatively large in area and composed of materials having relatively low permeability to oxygen and carbon dioxide, whereby the one or more atmosphere-control members provide at least a large proportion of the permeability of the container to oxygen and carbon dioxide; at least one of said one or more atmosphere-control members comprising a gas-permeable membrane which comprises
      (a) a microporous film which comprises a polymeric matrix which provides a network of interconnected pores such that gases can pass through the film, and
      (b) a polymeric coating on the film, the polymeric coating comprising a block copolymer which has a heat of fusion ΔH of at least 5 J/g, and which comprises
         (i) polysiloxane polymeric blocks, and
         (ii) crystalline polymeric blocks having a melting point, $T_p$, of −5 to 40° C.

16. A package according to claim 15 wherein the crystalline polymeric blocks are side chain crystalline polymeric blocks, $T_p$ is 0 to 15° C., ΔH is at least 10 J/g, and $T_p-T_o$ is less than 10° C., where $T_o$ is the onset of melting temperature.

17. A package according to claim 16 wherein the membrane
   (i) has a $P_{10}$ ratio, over at least one 10° C. range between −5 and 15° C., of at least 1.8; and
   (ii) has. an oxygen permeability (OTR) at all temperatures between 20° and 25° C., of at least 2,325,000 ml/m²·atm·24 hrs (150,000 cc/100 inch²·atm·24 hrs);
   the $P_{10}$ and OTR values being measured at a pressure of 0.035kg/cm² (0.5 psi).

18. A package according to claim 15 wherein the gas-permeable it membrane
   (i) has a $P_{10}$ ratio, over at least one 10° C. range between −5 and 15° C. of 2.0 to 2.8; and
   (ii) has an oxygen permeability at all temperatures between 20 and 25° C. of 2,480,000 to 3,410,000 ml/m²·atm·24 hrs. (160,000 to 220,000 cc/inch²·atm·24 hrs).

19. A package according to claim 15 wherein the microporous film
   (1) has an average pore size greater than 0.05 micron and less than 0.24 micron;
   (2) comprises a polymeric matrix selected from the group consisting of (a) essentially linear ultrahigh molecular weight polyethylene having an intrinsic viscosity of at least 18 deciliters/g and (b) essentially linear ultrahigh molecular weight polypropylene having an intrinsic viscosity of at least 6 deciliters/g; and
   (3) comprises a finely divided, particulate, substantially insoluble filler which is distributed throughout the film.

20. A package according to claim 15 wherein the coating weight of the block copolymer is 0.5 to 5 g/m².

21. A package according to claim 15 wherein the size and oxygen permeability of the barrier section or sections are such that, at 22° C., the amount of oxygen which enters the packaging atmosphere after passing through the barrier sections or sections is less than 25% of the total amount of oxygen which enters the packaging atmosphere.

22. A container which
   (A) can be sealed around a respiring biological material to provide a package which comprises
      (a) the sealed container, and
      (b) within the container, the respiring biological material and a packaging atmosphere around the biological material, and
   (B) comprises
      (i) one or more barrier sections, and
      (ii) one or more atmosphere-control members;
      the one or more barrier sections, by comparison with the one or more atmosphere-control members, being relatively large in area and composed of materials having relatively low permeability to oxygen and carbon dioxide, whereby the one or more atmosphere-control members provide at least a large proportion of the permeability of the container to oxygen and carbon dioxide;
      at least one of said one or more atmosphere-control members comprising a gas-permeable membrane which comprises
         (a) a microporous film which comprises a polymeric matrix which provides a network of interconnected pores such that gases can pass through the film, and
         (b) a polymeric coating on the film, the polymeric coating comprising a block copolymer which has a heat of fusion ΔH of at least 5 J/g, and which comprises
            (i) polysiloxane polymeric blocks, and
            (ii) crystalline polymeric blocks having a melting point, $T_p$, of −5 to 40° C.

23. A container according to claim 22, wherein the gas-permeable membrane
   (i) has a $P_{10}$ ratio, over at least one 10° C. range between −5 and 15° C., of at least 1.8; and
   (ii) has an oxygen permeability (OTR) at all temperatures between 20 and 25° C., of at least 2,325,000 ml/m²·atm·24 hrs (150,000 cc/100 inch²·atm·24 hrs);
   $P_{10}$ and OTR values being measured at a pressure of 0.035 kg/cm² (0.5 psi).

24. A container according to claim 22, wherein the gas-permeable membrane
   (i) has a $P_{10}$ ratio, over at least one 10° C. range between −5 and 15° C. of 2.0 to 2.8; and
   (ii) has an oxygen permeability at all temperatures between 20 and 25° C. of 2,480,000 to 3,410,000 ml/m²·atm·24 hrs. (160,000 to 220,000 cc/inch²·atm·24 hrs).

25. A container according to claim 22 wherein the microporous film (1) has an average pore size greater than 0.05 micron and less than 0.24 micron;

(2) comprises a polymeric matrix selected from the group consisting of (a) essentially linear ultrahigh molecular weight polyethylene having an intrinsic verbosity of at least 18 deciliters/g, and (b) essentially linear ultrahigh molecular weight polypropylene having an intrinsic viscosity of at least 6 deciliters/g; and (3) comprises a finely divided, particulate, substantially insoluble filler which is distributed throughout the film.

26. A container according to claim 22 wherein the coating weight of the block copolymer is 0.5 to 5 g/m$^2$.

27. A container according to claim 22 wherein $T_p$ is −5 to 15° C.

28. A container according to claim 25 wherein the membrane has a $P_{10}$ ratio between 0 and 10° C. of at least 2.0, the $P_{10}$ being measured at a pressure of 0.035 kg/cm$^2$ (0.5 psi).

29. A container according to claim 22 which has an OTR of 775,000 to 3,875,000 ml/m$^2$·atm·24 hrs (50,000 to 250,000 cc/100 inch$^2$·atm·24 hrs); and an R ratio of at least 2.5; the $P_{10}$, OTR and R values being measured at a pressure of 0.035 kg/cm$^2$ (0.5 psi).

30. A container according to claim 22 wherein the block copolymer has at least one of the following characteristics:

(1) it has a $T_p$ of 0 to 15° C. and a ΔH of at least 10 J/g;

(2) the crystalline polymeric blocks are side chain crystalline polymeric blocks; and (3) $T_p$−$T_o$ is less than 10° C., where $T_o$ is the onset of melting temperature.

31. A container according to claim 22 wherein the crystalline polymeric blocks in the block copolymer were prepared by copolymerizing (i) at least one n-alkyl acrylate or methacrylate in which the n-alkyl group contains at least 12 carbon atoms and (ii) one or more comonomers selected from acrylic acid, methacrylic acid, and esters of acrylic or methacrylic acid in which the esterifying group contains less than 10 carbon atoms.

32. A membrane according to claim 22 wherein the block copolymer was prepared by copolymerizing a mixture of reactants which comprises (i) at least one n-alkyl acrylate or methacrylate in which the n-alkyl group contains at least 12 carbon atoms and (ii) a polysiloxane having a copolymerizable group at one end thereof.

33. A membrane according to claim 22 wherein the block copolymer was prepared by reacting (i) a crystalline polymer having a melting point of −5 to 40° C. and containing at least one reactive group, and (ii) a polysiloxane containing at least one reactive group which will react with said reactive group on the crystalline polymer.

34. A membrane according to claim 22 wherein the crystalline polymeric blocks in the block copolymer are side chain crystalline polymeric blocks, $T_p$ is 0 to 15° C., ΔH is at least 10 J/g, and $T_p$−$T_o$ is less than 10° C., where $T_o$ is the onset of melting temperature.

35. A membrane according to claim 22 wherein the membrane (iii) has a $P_{10}$ ratio, over at least one 10° C. range between −5 and 15° C., of at least 1.8; and (iv) has an oxygen permeability (OTR) at all temperatures between 20 and 25° C., of at least 2,325,000 ml/m$^2$·atm·24 hrs (150,000 cc/100 inch$^2$·atm·24 hrs);

the $P_{10}$ and OTR values being measured at a pressure of 0.035 kg/cm$^2$ (0.5 psi).

36. A container according to claim 22 wherein the size and oxygen permeability of the barrier sections or sections are such that, at 22° C., the amount of oxygen which passes through the barrier section or sections is less than 25% of the total amount of oxygen which passes through the container.

* * * * *